Figures 1, 3:
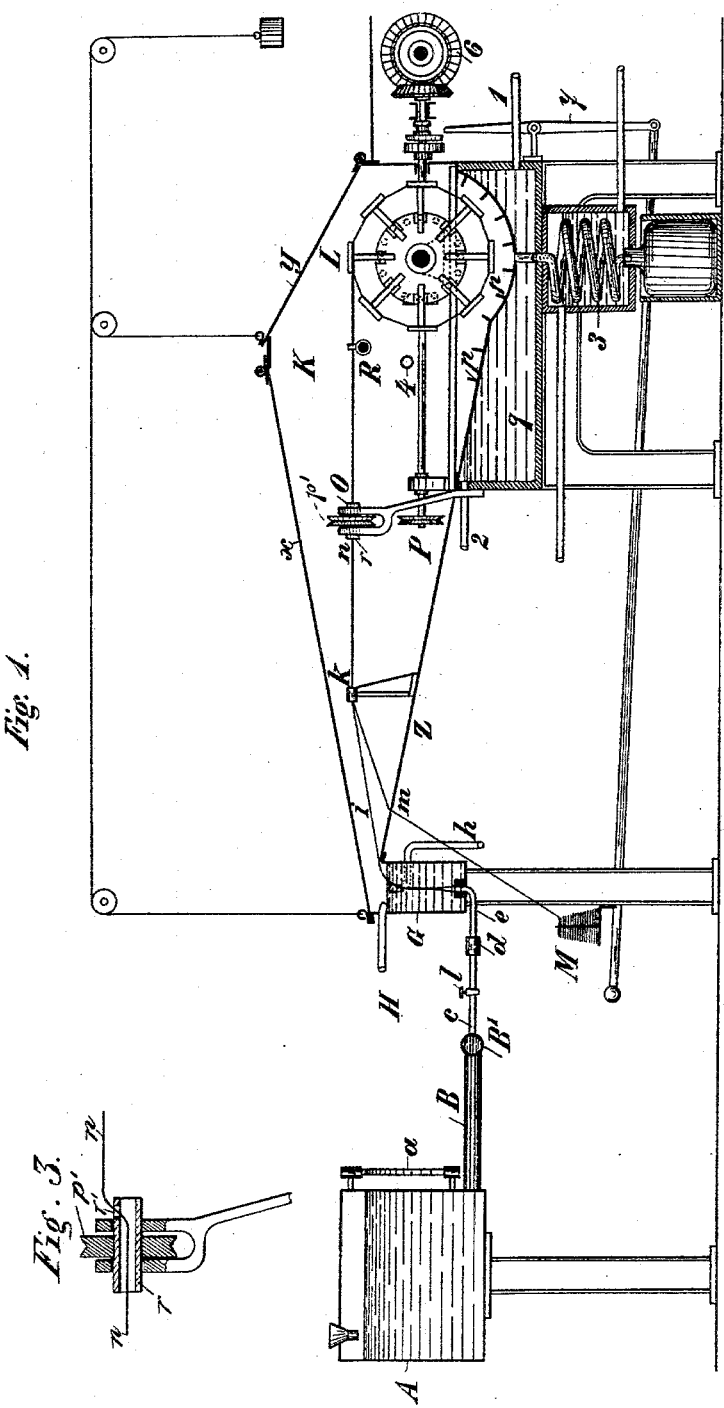

(No Model.) 2 Sheets—Sheet 1.

F. LEHNER.
PROCESS OF AND APPARATUS FOR MAKING ARTIFICIAL SILK.

No. 562,732. Patented June 23, 1896.

Witnesses:
Wm. Schulz.
A. Joughman.

Inventor:
F. Lehner
by his attorneys
Roeder & Briesen

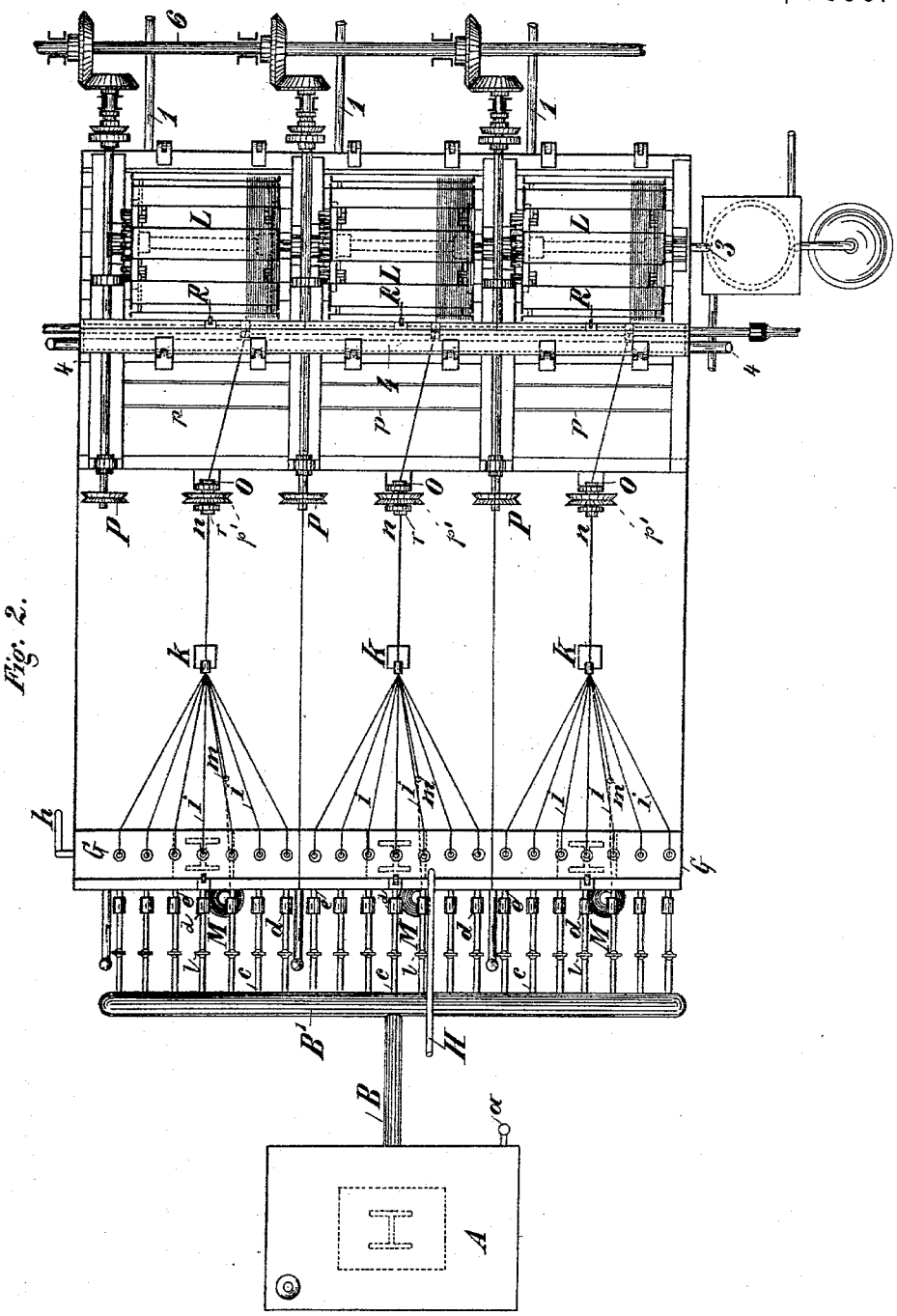

UNITED STATES PATENT OFFICE.

FRIEDRICH LEHNER, OF AUGSBURG, GERMANY.

PROCESS OF AND APPARATUS FOR MAKING ARTIFICIAL SILK.

SPECIFICATION forming part of Letters Patent No. 562,732, dated June 23, 1896.

Application filed July 25, 1891. Serial No. 401,014. (No model.) Patented in Germany November 9, 1889, No. 55,949; in Italy September 30, 1890, No. 27,943; in Austria-Hungary April 29, 1891, No. 54,062 and No. 9,475; in Switzerland June 22, 1891, No. 3,740, and in England July 11, 1891, No. 11,831.

*To all whom it may concern:*

Be it known that I, FRIEDRICH LEHNER, a resident of Augsburg, Bavaria, Germany, have invented certain new and useful Improvements in Processes of and Apparatus for Making Artificial Silk, (patented in Germany, No. 55,949, dated November 9, 1889; in Great Britain, No. 11,831, dated July 11, 1891; in Austria-Hungary, No. 54,062 and No. 9,475, dated April 29, 1891; in Italy, No. 27,943, dated September 30, 1890, and in Switzerland, No. 3,740, dated June 22, 1891,) of which the following is a specification.

My invention relates to the art of producing artificial silk, its object being to obtain a fiber, without the aid of the silk-worm, which shall possess all the desirable characteristics and qualities of the natural silk, and which shall, at the same time, be produced far more cheaply and conveniently.

With these objects in view my invention consists in the substance or article, and the method and means for producing the same, all as hereinafter set forth, and more particularly pointed out in the claims.

The artificial fiber or thread involving my invention consists of a mixture of a resin, such as copal, sandarac, damar, or the like, with an oil, such as linseed-oil, nitrocellulose, and an inorganic salt for rendering the fiber incombustible. The thread or fiber so constituted is obtained by drawing the same from a ground solution, preferably formed by mixing three solutions, of which the following are examples:

Solution 1 is formed by dissolving five hundred grams finely-pulverized resin (copal, sandarac, or the like) in two thousand four hundred grams of ether, shaking the mixture thoroughly at a moderate temperature in a well-stoppered bottle, and permitting the same to stand several days until it becomes clear. The clear solution is then poured off or decanted and mixed with one hundred grams linseed-oil and then filtered.

Solution 2, the cellulose solution, is prepared by immersing silk-paper, cellulose, cotton, or wastes from spinning for about fifteen minutes in a solution of cupro-ammonium oxid obtained by dissolving ten parts sulfate of copper (copper vitriol) in one hundred parts of an aqueous solution of ammonia having the specific gravity 0.975. The cellulose substance is added to the cupro-ammonium-oxid solution in the proportion of about one kilogram of the former to twelve liter of the solution. In some instances a five per cent. alkaline solution, such as a solution of caustic potash or caustic soda, may be employed in lieu of the cupro-ammonium-oxid solution. The function of the cupro-ammonium-oxid solution or its equivalents is to cause the several cellulose fibers to swell and hence to facilitate the subsequent nitration. The mass or pulp is then removed from the bath, thoroughly washed in much warm water, expressed, and finally well dried, (preferably at 110° Celsius.) It is then transferred, in as flaky a condition as possible, into a mixture of four parts sulfuric acid having a specific gravity of 1.84 and three parts of nitric acid of the specific gravity 1.4, the mixture being heated to 75° centigrade. It is well stirred in the bath and the acid is poured off after five minutes. The nitrocellulose so obtained is thoroughly washed with water, dried, and thereupon wood-spirits is poured upon the same in the proportion of nine parts by weight of the former to one part of the nitrocellulose. This mixture is then thoroughly shaken until all the nitrocellulose has passed into solution. The solution is then set aside in a cool place for about eight days, until it has become clear, when it is poured off or decanted from the sediment.

Solution 3 is prepared by dissolving one hundred grams of sodium acetate (or of ammonium salts) in one thousand grams of dilute alcohol. This solution of an alkali salt is for the purpose of rendering the resultant fiber or thread incombustible.

The above three solutions are now mixed so that one kilogram nitrocellulose is combined with two hundred grams resin, fifty grams linseed-oil, and from one hundred to two hundred grams of sodium acetate, (or salt of ammonium.) The mixture so prepared forms the ground solution or liquid from which the threads or fiber constituting the artificial silk are formed. This may be done by simply causing the liquid to flow into the atmosphere upon a rotating smooth and warmed cylinder or upon a moving smooth surface, whereby the solvents, wood-spirits, ether, and alcohol are evaporated, leaving a strong wide filament of the artificial fiber upon the surface, the said fiber consisting of nitrocellulose combined with a resinous substance and oil, and preferably a salt, rendering the same incombustible. I have found, however, that in order to produce a thread or fiber having the characteristic luster and the other prized qualities of silk, the ground liquid should not be allowed to pass directly into the air but through a fine tube into a bath of some solvent of the solvents employed in the three component solutions, consisting of liquids which contain neither water nor oxygen, which would have an oxidizing reaction. Such a bath may consist of oil of turpentine, oil of juniper, benzin, benzol, petroleum, or generally of a liquid hydrocarbon or hydrocarbons or of sulfo-carburets. Were the thread, as it issues from the orifice under the bath, drawn through a solution or congealing-bath of water or containing water or oxygen, it would not possess the luster and other desirable qualities of the silk. When, however, the liquid is made to pass under a congealing-bath of one of the above liquids (which is done by causing the liquid to issue through fine orifices having a bore of, e. g., one-half millimeter, and under a slight pressure caused by having the level of the bath elevated a few centimeters above the orifices) a thick filament is formed, which may be drawn fine within the bath, and which, after the proper exposure, is strong, glossy, and silk-like, and which may then be reeled and spun.

Another way of carrying out my invention is the following, which, though covered by the generic claims of this application, is not herein claimed specifically, inasmuch as it forms the subject-matter of another application filed by me on the 16th of April, 1895, and having the Serial No. 545,930. The ground-solution under this modified process may be prepared as follows: Silk wastes of all kinds and remnants not fit to be spun are cleaned, treated for twenty-four hours with concentrated solutions of potash or soda or copper-ammonium oxid to dissolve the silk particles. The resultant solution is filtered, diluted, and neutralized by an acid to separate the silk matter (a mixture of fibroin and sericin) in the form of fine threads. This silk matter is well washed and dissolved in concentrated acetic acid.

Cellulose, tissue-paper, cotton-wastes from spinning are treated in the manner already mentioned with potash and are nitrated. The nitrocellulose thus obtained is dissolved in a mixture of wood-spirit and ether, with the addition of a little ethyl sulfuric acid, ($C_2H_5HSO_4$.) The two mixtures are united in the proportion of five parts nitrocellulose to one part silk substance.

By emitting the mixture through a contracted opening upon a rotating smooth cylinder or upon a moving smooth surface, the solvents will be evaporated and a firm wide filament will be produced; or the filament may be produced, as already stated, by causing the mixture to enter out of a contracted opening into the congealing-bath of oil of turpentine, oil of juniper, petroleum, benzin, benzol, liquid hydrocarbons, chloroform, sulfo-carburets, or similar solvent containing no oxygen or water. The mixture coming out of the tube is either in the form of a thick thread or of a lump settling upon the mouth of the tube. This lump is seized by a wire and is drawn slowly out of the congealing mixture. It will thus form a fine thread, that can be steadily drawn off and can be made thicker or thinner, according to the velocity with which it is reeled.

On entering the congealing-bath the thread is thick and quite soft, and, after having traversed about one-third of its way within the bath, it assumes the necessary fineness. The last two-thirds of the way within the bath causes the thread to lose the main portion of the solvents and to gain in firmness. Thus, on leaving the bath, the thread is fine and firm. Were the thread to be drawn through a bath, say of water, this desirable result would not be obtained and the thread would remain without luster and would not assume the prized characteristics of silk; nor is it necessary, with my process, to have the exit-opening of very fine bore, which is is apt to become rapidly clogged; nor need there be a strong pressure. The simple flowing of the liquid into the bath causes the formation of the fine thread within the bath, the degree of fineness being dependent upon the greater or lesser rapidity of drawing forth the thread.

If desired, the thread thus formed may be combined with a thread of silk, cotton, wool, or other material, and thus a spun-mixed thread may be formed.

In the accompanying drawings, Figure 1 is an elevation, partly in section, of the apparatus for carrying my invention into effect. Fig. 2 is a plan of the same, and Fig. 3 represents a detail view of the thread-twister.

The letter A represents a tank having a gage $a$, and adapted to be filled with the mixture described, that should be kept at approximately the same level. The mixture flows out of tube B and transverse tube B' into a number of smaller tubes $c$, each of which carries a cock $l$. To these tubes there are connected, by rubber couplings $d$, the bent glass tubes $e$, drawn out somewhat to a point and entering from below a narrow tank G. The glass tubes pass through a proper packing into the tank, to prevent leakage. The tank G is filled with the congealing-bath described, such as oil of turpentine, petroleum, &c., and should have a somewhat lower level than tank A. By this slight difference in pressure a mixture is ejected from tubes e, either in the form of thick threads or in the form of gradually-increasing lumps that form upon the ends of the tubes. The lump is caught by a wire and drawn slowly out of the tank G, over guide k, through twister O and guide R upon reel L. This reel thus steadily draws the thread i out of tank G, the fineness of the thread being proportional to the velocity of the reel. The thread on leaving the tank is thick and soft, but rapidly grows thin and strong within the tank, in the manner already described.

The main solvents of the mixture, i.e., wood-spirit, ether-alcohol, are dissolved within the bath, and thus the thread gains consistency and strength within the bath itself. Fresh liquid is continuously added through inlet H, while the liquid mixed with the solvent flows off through exit h. From this liquid the solvent can be readily regained by fractional distillation.

The threads i may be united with one another or with a thread m of a different material at the tubes or guides k. The thread m passes from reel M and is simultaneously reeled with thread i upon reel L. The bottom Z of the apparatus has a small perforation through which the thread m is admitted. When a spool M is run down, it is at once replaced by a full spool.

The threads united at k enter the twister O. This twister consists, essentially, of a rapidly-rotating tube r, (see particularly Fig. 3,) having a lateral opening r', i. e., an opening in its periphery. The thread enters the bore of the tube and leaves the same through the lateral opening, so that the revolution of the tube causes a twisting of the thread. This twisting of the thread is permitted for the reason that the end of the thread at the orifice of the tube e is still in a liquid or semi-liquid condition and is, hence, not held fast at this point. Upon the tubes are mounted the pulleys p, that are driven by a belt (not shown) from the pulleys P. These pulleys receive their motion from a power-shaft 6 by suitable gearing. The reels L continually draw the thread through the twister out of the tank G and off the reel M. Between the reel L and twister O a thread-guide R is arranged which has a reciprocating motion and places the twisted thread upon the reel in the proper manner.

The means for imparting a reciprocating motion to the guide R may be of any of the well-known constructions, and inasmuch as it forms no part of the present invention, and is not necessary to a proper understanding of the same, it has not been illustrated.

The threads i m are united in a closed chamber K, which also contains the twister O, thread-guide R, and reel L. To this chamber ready access may be gained by means of two hinged windows x and y. The floor Z of the chamber serves as a condenser for the wood-spirit, ether-alcohol vapors, oil of turpentine, benzin, petroleum, &c., still adhering to the threads. The floor is provided with partitions p, Fig. 1, which accelerate the condensation by presenting a greater cooling-surface. A large portion of the floor is in contact with a basin q, filled with cold water, which continually enters at 1 and, when warmed, leaves at 2.

The condensed wood-spirit, benzin-vapors, &c., pass from the floor through a cooling-coil 3 and are collected at the end thereof. To rid the threads as much as possible from these adhering matters, a heating-tube 4 is passed through the apparatus. Through this tube there flows a stream of hot water, so that the upper part of the apparatus is heated.

The work-shaft 6 operates the twister O, and the reels L, by suitable intergearing-levers 7, serve to throw any of the reels out of motion.

When I employ no inorganic salt in the ground solution to render the resultant thread or fiber incombustible, artificial thread, produced as described, is readily combustible, owing to the large percentage of nitrogen contained therein. This can be partly or entirely removed without impairing the durability of the plain or mixed thread by placing the thread for some time into a bath of diluted sulfuric acid, washing it and treating it finally with a highly-diluted alkali solution; or the threads may be washed in a solution of sulfid of potassium, at a specific gravity of 1.26, and afterward in plenty of water.

What I claim, and desire to secure by Letters Patent, is—

1. The process of forming artificial thread, which consists in passing a ground solution into a bath free from oxygen, and then drawing the thread forth from the bath, substantially as set forth.

2. The process of forming artificial thread, which consists in passing a ground solution into a bath of carbon compound, and then drawing the thread forth from the bath, substantially as set forth.

3. The process of forming artificial thread, which consists in passing a ground solution into a bath of hydrocarbon, and then drawing the thread forth from the bath, substantially as set forth.

4. The process of forming artificial thread, which consists in passing a ground solution into a bath of oil of turpentine, and then drawing the thread forth from the bath, substantially as set forth.

5. The process of forming artificial thread, which consists in preparing a ground liquid of resin, linseed-oil, nitrocellulose and an inorganic salt to render the thread incombustible, then passing said ground liquid into a bath free from water, and then drawing forth the thread, substantially as set forth.

6. The process of forming artificial thread, which consists in preparing a ground liquid of resin, linseed-oil, nitrocellulose and an inorganic salt to prevent combustibility, then passing said ground liquid into a hydrocarbon bath, and then drawing forth the thread, substantially as set forth.

7. The process of forming artificial thread, which consists in preparing a ground liquid of resin, linseed-oil, nitrocellulose and an inorganic salt to prevent combustibility, then passing the ground liquid through a bath of oil of turpentine, and then drawing forth the thread from the bath, substantially as set forth.

8. The combination, of tank, A, with tubes, B, B', e, tank, G, chamber, K, and with twister, O, reel, L, cooler, q, bottom, Z, having partitions, p, heating-pipe, 4, and cooling-coil, 3, substantially as specified.

9. In an apparatus for making artificial silk, a chamber, as K, for inclosing the thread-forming device, provided with a bottom provided with partitions, p, in combination with a cooling-basin, in contact with said bottom, and a collecting device, as 3, substantially as set forth.

In testimony that I claim the foregoing as my invention I have signed my name in presence of two subscribing witnesses.

F. LEHNER.

Witnesses:
F. WINTERGUST,
AULICK ROEDER.